Patented Feb. 3, 1953

2,627,521

UNITED STATES PATENT OFFICE 2,627,521

EPOXY ALKANE PHOSPHONATES

Harry W. Coover, Jr., Kingsport, Tenn., assignor to Eastman Kodak Company, Rochester, N. Y., a corporation of New Jersey No Drawing. Application September 27, 1950, Serial No. 187,126

13 Claims. (Cl. 260—348)

This invention relates to epoxy alkane phosphonates, to polymers thereof, and to a process for preparing the same.

It is known that epoxy compounds will react with phosphorus compounds to form various esters of phosphorus acids. For example, Lommel et al. in U. S. Patent 1,936,985, dated November 28, 1933, describe phosphorous and phosphoric acid esters prepared by reacting an alkylene oxide such as ethylene oxide, epichlorohydrin, etc. with a phosphorus trihalide or oxyhalide. The resulting esters contain no epoxy groups and are not polymerizable to resinous products.

We have now found that by reacting epoxy compounds which have the following general formula:

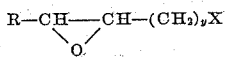

wherein $y$ represents 1 or 2, R represents an atom of hydrogen, an alkyl group containing from 1 to 4 carbon atoms, e. g. methyl, ethyl, propyl, isopropyl, butyl, etc. groups or an aryl group, e. g. a phenyl group, and X represents a halogen atom such as chlorine, bromine, etc., with an organo phosphite compound having the general formula:

wherein $R_1$ represents an alkyl group containing from 1 to 4 carbon atoms, a phenyl group or a substituted phenyl group such as tolyl group, and Z represents the group $R_1$ or an alkali-metal such as an atom of sodium, potassium, lithium, etc., that the epoxy group remains unchanged, the products obtained having the following general formula:

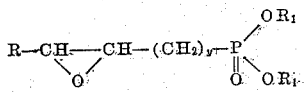

wherein $y$, R and $R_1$ have the previously defined meanings. The above products of the invention are normally slightly viscous liquids which can be fractionated under reduced pressures without decomposition. They are valuable intermediates for the preparation of fungicides, insecticides, dyestuffs, etc., as well as being useful plasticizers and stabilizers for various polyvinyl resins and cellulose derivatives. They are also polymerizable in the presence of condensation catalysts to resinous materials which are characterized by high heat stability and low inflammability.

It is, accordingly, an object of the invention to provide a new class of organo phosphorous compounds. Another object is to provide resinous products thereof. Another object is to provide a process for preparing the same. Other objects will become apparent hereinafter.

In accordance with my invention, I prepare the new class of epoxyalkane phosphonates by reacting an epoxy alkyl halide with substantially an equivalent amount of a trialkyl or triaryl phosphite or with an alkali-metal salt of a dialkyl or diaryl phosphite, heating the reaction mixture until the alkyl or aryl halide by-product which forms is distilled off, preferably until the stoichiometric quantity of the alkyl or aryl halide is collected as a distillate, and then separating the formed epoxyalkane phosphonate from the residual reaction mixture by conventional means such as, for example, by fractional distillation of the mixture. Where the alkali-metal salt of a dialkyl or diaryl phosphite is employed, the reaction is preferably carried out in an inert solvent medium such as benzene, toluene, xylene, low boiling saturated hydrocarbons, etc., in which case the epoxy alkyl halide is added gradually or dropwise to the solution containing the alkali-metal salt of the dialkyl or diaryl phosphite, meanwhile maintaining the reaction mixture at a temperature of from 0° to 15° C., and then on completion of the addition heating the reaction mixture to gentle reflux for an hour or more, followed by distilling off the inert solvent and separating the epoxyalkane phosphonate by fractionally distilling the residual reaction mixture.

Suitable epoxy alkyl halides include epichlorohydrin, epibromohydrin, epifluorohydrin, β-phenyl-β-chloromethyl ethylene oxide (2-phenyl-2-chloromethyl oxirane), α-methyl-β-chloromethyl ethylene oxide, α-methyl-β-bromomethyl ethylene oxide, α-ethyl-β-bromomethyl ethylene oxide, α-ethyl-β-bromoethyl ethylene oxide, α-ethyl-β-(α-chloroethyl) ethylene oxide, α-butyl-β-bromoethyl ethylene oxide, α-phenyl-β-chloromethyl ethylene oxide (3-phenyl-2-chloromethyl oxirane), α-phenyl-β-(α-chloroethyl) ethylene oxide, etc. Suitable phosphites include trimethyl phosphite, triethyl phosphite, tripropyl phosphite, tributyl phosphite, sodium dimethyl phosphite, sodium diethyl phosphite, potassium dibutyl phosphite, lithium dimethyl phosphite, triphenyl phosphite, sodium diphenyl phosphite, potassium diphenyl phosphite, tri-(p-tolyl) phosphite, sodium di-(p-tolyl) phosphite, and similar dialkyl, diaryl, trialkyl and triaryl phosphites. The reaction between the epoxy alkyl halide and the mentioned phosphite compounds is carried out preferably with equimolar quantities, although an excess of either reagent will also give relatively good results. The temperature of the reaction where a trialkyl or a triaryl phosphite is employed can be varied widely, but preferably a temperature is maintained sufficient to cause reaction to take place and to distill off the alkyl or aryl halide as fast as it is formed, that is, from 50° to 150° C.

The polymerization of the various epoxyalkane phosphonates of the invention to viscous and resinous products is carried out by heating one or more of the mentioned epoxyalkane phosphonates in the presence of acidic or basic catalysts such as sulfuric acid, phosphoric acid, alkali-metal hydroxides (e. g. sodium, potassium, lithium, etc. hydroxides), alkali-metal alkoxides (e. g. sodium ethoxide, potassium ethoxide, etc.), pyridine, quinoline, etc. The amount of catalyst employed is usually only a trace, but good results can be obtained with amounts up to 5% by weight of the compounds to be polymerized. The polymerization temperature can be varied widely, but preferably it is carried out at from 100° to 150° C. The molecular weight of the polymerized product can be controlled by the temperature, time, type of catalyst, and so forth, just as is done in the preparation of polyethylene glycol. Higher temperatures and longer time periods, in general, favor the formation of products of greater molecular weight. The polymerized products are soluble in organic solvents such as alcohols, ethers, acids, nitriles and amides (e. g. methanol, ethanol, 1,4-dioxane, acetic acid, acetonitrile, dimethyl formamide, etc.).

The following examples will serve further to illustrate the monomeric and polymeric epoxyalkane phosphonates of the invention and the manner of preparing the same.

*Example 1.—2,3-epoxypropane-1-diethyl phosphonate*

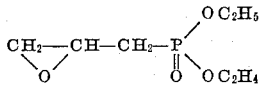

A mixture of 68.5 g. (0.5 mol) of epibromohydrin and 83 g. (0.5 mol) of triethyl phosphite was heated in a distillation flask at such temperature that ethyl bromide (B. P. 38° C.) distilled from the reaction mixture. Heating was continued until the theoretical amount of ethyl bromide corresponding to completion of the reaction was collected. The residue in the flask was then fractionally distilled under reduced pressure. A yield of 52 g. of 2,3-epoxypropane-1-diethyl phosphonate, B. P. 94°–97° C./1.4 mm. pressure, was obtained.

By substituting an equivalent amount of trimethyl phosphite in place of the triethyl phosphite in the above example, there was obtained a good yield of 2,3-epoxypropane-1-dimethyl phosphonate (B. P. 85°–87° C./1.4 mm. pressure.

*Example 2.—2,3-epoxypropane-1-dibutyl phosphonate*

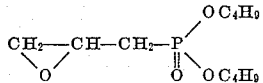

(a) A mixture of 68.5 g. of epibromohydrin and 125 g. (0.5 mol) of tributyl phosphite was heated in a distillation flask at such temperature that butyl bromide (B. P. 101.6° C.) distilled from the reaction mixture. Heating was continued until the theoretical amount of butyl bromide corresponding to completion of the reaction was distilled off and collected. The residue in the flask was then fractionally distilled to give 65 g. of 2,3-epoxypropane-1-dibutyl phosphonate, B. P. 118°–123° C./1.2 mm. pressure.

By using an equivalent amount of epichlorohydrin in place of the epibromohydrin in the above example, the same product, 2,3-epoxypropane-1-dibutyl phosphonate, was obtained.

(b) 2.3 g. (0.1 mol) of metallic sodium and 30 cc. of dry toluene were placed in a three-necked round bottom flask equipped with a stirrer, a dropping funnel and a reflux condenser closed at the top with a calcium chloride tube. The toluene was gently refluxed and 19.4 g. (0.1 mol) of dibutyl hydrogen phosphite were added dropwise. Refluxing and stirring were continued until the sodium had reacted completely. The sodium dibutyl phosphite thus obtained was cooled and 13.7 g. (0.1 mol) of epibromohydrin were added dropwise. During the addition, the temperature was kept below 15° C. When the addition was completed, the reaction mixture was refluxed gently with stiring for 2 hours. The mixture was then cooled and washed thoroughly with water. After removal of the toluene by distillation, the residual mixture was fractionated to give 2,3-epoxypropane-1-dibutyl phosphonate in good yield.

The above reaction takes place readily with other of the mentioned epoxy alkyl halides to give the corresponding alkane phosphonates. Also by using the sodium salts of other dialkyl or diaryl phosphites the corresponding epoxyalkane dialkyl and diaryl phosphonates are obtained.

*Example 3.—2,3-epoxypropane-1-dipropyl phosphonate*

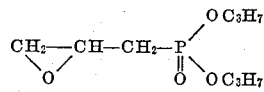

A mixture of 68.5 g. of epibromohydrin and 104 g. (0.5 mol) of tripropyl phosphite was heated in a distillation flask at sufficient temperature and time to distill off the calculated amount of propyl bromide (B. P. 70.9° C.) for completion of the reaction. A good yield of 2,3-epoxypropane-1-dipropyl phosphonate, B. P. 105°–107° C./1.2 mm. pressure, was obtained by fractionally distilling the residual reaction mixture.

*Example 4.—2,3-epoxypropane-1-diphenyl phosphonate*

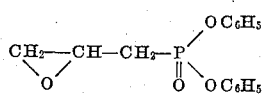

0.5 gram-mole of the sodium salt of diphenyl hydrogen phosphite was prepared according to the directions in Example 2 (b) for preparing sodium dibutyl phosphite. The sodium diphenyl phosphite thus obtained was cooled and 46.3 g. (0.5 mol) of epichlorohydrin were added dropwise. During the addition, the temperature was kept at 5°–15° C. When the addition was completed, the reaction mixture was refluxed gently with stirring for 2 hours. The mixture was then cooled and washed thoroughly with water. After removal of the toluene by distillation, the residual mixture was distilled in a molecular still to give 2,3-epoxypropane-1-diphenyl phosphonate in practical quantity yield. The boiling point of

Example 5.—Polymer of 2,3-epoxypropane-1-dibutyl phosphonate 10 g. of 2,3-epoxypropane-1-dibutyl phosphonate plus a trace of sulfuric acid were heated at 90° C. for a period of 3 hours. A light yellow, very viscous product was obtained. It was soluble in acetonitrile.

By substituting one or more of the other mentioned catalysts for the sulfuric acid in the above example, similar light colored viscous to resinous products are obtained. The process of the above example is also applicable to the preparation of generally similar polymeric products with all of the epoxyalkane dialkyl and diaryl phosphonates of the invention.

By proceeding as described in the foregoing examples, other epoxyalkane dialkyl and diaryl phosphonates, and polymeric products thereof, can be prepared such as, for example, 3,4-epoxybutane-1-dimethyl phosphonate, 3,4-epoxybutane-1-diethyl phosphonate, 3,4-epoxybutane-1-dipropyl phosphonate, 3,4-epoxybutane-1-dibutyl phosphonate, 3,4-epoxybutane-1-diphenyl phosphonate, 2,3-epoxybutane-1-dimethyl phosphonate, 2,3-epoxybutane-1-dibutyl phosphonate, 3-phenyl-2,3-epoxypropane-1-dimethyl phosphonate, 3-phenyl-2,3-epoxypropane-1-dibutyl phosphonate, 3-phenyl-2,3-epoxypropane-1-diphenyl phosphonate, 3,4-epoxyhexane-2-dimethyl phosphonate, 3,4-epoxyhexane-2-dibutyl phosphonate, 4-phenyl-3,4-epoxybutane-2-dimethyl phosphonate, and similar compounds.

What is claimed is:

1. An epoxyalkane phosphonate having the general formula:

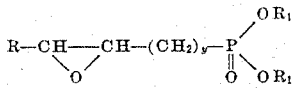

wherein $y$ represents a positive whole number selected from the group consisting of 1 and 2, R represents a member selected from the group consisting of an atom of hydrogen, an alkyl group containing from 1 to 4 carbon atoms and a phenyl group, and $R_1$ represents a member selected from the group consisting of an alkyl group containing from 1 to 4 carbon atoms and a phenyl group.

2. An epoxyalkane phosphonate having the general formula:

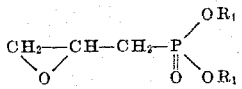

wherein $R_1$ represents an alkyl group containing from 1 to 4 carbon atoms.

3. 2,3-epoxypropane-1-dimethyl phosphonate.
4. 2,3-epoxypropane-1-diethyl phosphonate.
5. 2,3-epoxypropane-1-dipropyl phosphonate.
6. 2,3-epoxypropane-1-dibutyl phosphonate.
7. 2,3-epoxypropane-1-diphenyl phosphonate.

8. A process for preparing an epoxyalkane phosphonate having the general formula:

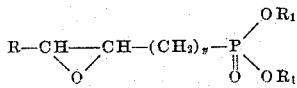

wherein $y$ represents a positive whole number selected from the group consisting of 1 and 2, R represents a member selected from the group consisting of an atom of hydrogen, an alkyl group containing from 1 to 4 carbon atoms and a phenyl group, and $R_1$ represents a member selected from the group consisting of an alkyl group containing from 1 to 4 carbon atoms and a phenyl group, comprising reacting an epoxy compound having the general formula:

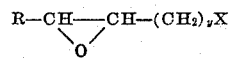

wherein $y$ and R have the previously defined meanings and wherein X represents a halogen atom, with an organo phosphite compound represented by the following general formula:

wherein $R_1$ has the above defined meaning and Z represents a member selected from the group consisting of $R_1$ and an alkali-metal atom, heating the reaction mixture until the reaction is completed, and separating the epoxyalkane phosphonate from the reaction mixture.

9. A process for preparing 2,3-epoxypropane-1-dimethyl phosphonate comprising reacting epibromohydrin with trimethyl phosphite, heating the reaction mixture until no more of the methyl bromide which forms distills off, and separating the 2,3-epoxypropane-1-dimethyl phosphonate by fractionally distilling the residual reaction mixture.

10. A process for preparing 2,3-epoxypropane-1-diethyl phosphonate comprising reacting epibromohydrin with triethyl phosphite, heating the reaction mixture until no more of the ethyl bromide which forms distills off, and separating the 2,3-epoxypropane-1-diethyl phosphate by fractionally distilling the residual reaction mixture.

11. A process for preparing 2,3-epoxypropane-1-dibutyl phosphonate comprising reacting epibromohydrin with tributyl phosphite, heating the reaction mixture until no more of the butyl bromide which forms distills off, and separating the 2,3-epoxypropane-1-dibutyl phosphonate by fractionally distilling the residual reaction mixture.

12. A process for preparing 2,3-epoxypropane-1-diphenyl phosphonate comprising reacting epichlorohydrin with triphenyl phosphite, heating the reaction mixture until no more of the chlorobenzene which forms distills off, and separating the 2,3-epoxypropane-1-diphenyl phosphonate by fractionally distilling the residual reaction mixture.

13. A process for preparing 2,3-epoxypropane-1-dibutyl phosphonate comprising adding epibromohydrin to sodium dibutyl phosphite while maintaining the mixture at from 0° to 15° C., heating the reaction mixture at refluxing temperature until completion of the reaction, and separating the 2,3-epoxypropane-1-dibutyl phosphonate by fractional distillation of the reaction mixture.

HARRY W. COOVER, Jr.

REFERENCES CITED

The following references are of record in the file of this patent:

UNITED STATES PATENTS

| Number | Name | Date |
| --- | --- | --- |
| 1,936,985 | Lommel et al. | Nov. 28, 1933 |
| 1,944,530 | Schonburg | Jan. 23, 1934 |
| 2,455,912 | Cairns et al. | Dec. 14, 1948 |
| 2,469,683 | Dudley et al. | May 10, 1949 |